Figure 5:
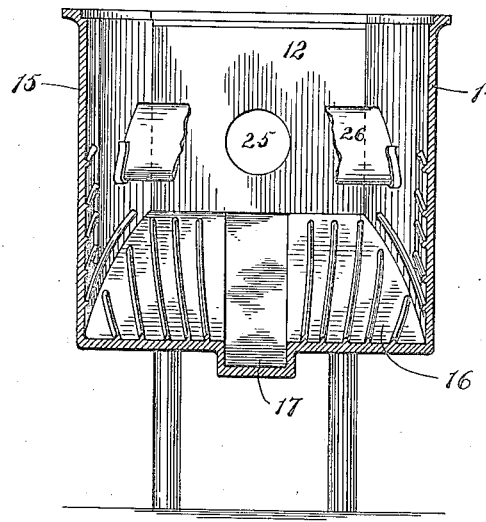

Nov. 20, 1923.
S. L. MARSH
1,474,938
GREASE INTERCEPTOR
Original Filed Aug. 19, 1919   2 Sheets-Sheet 1
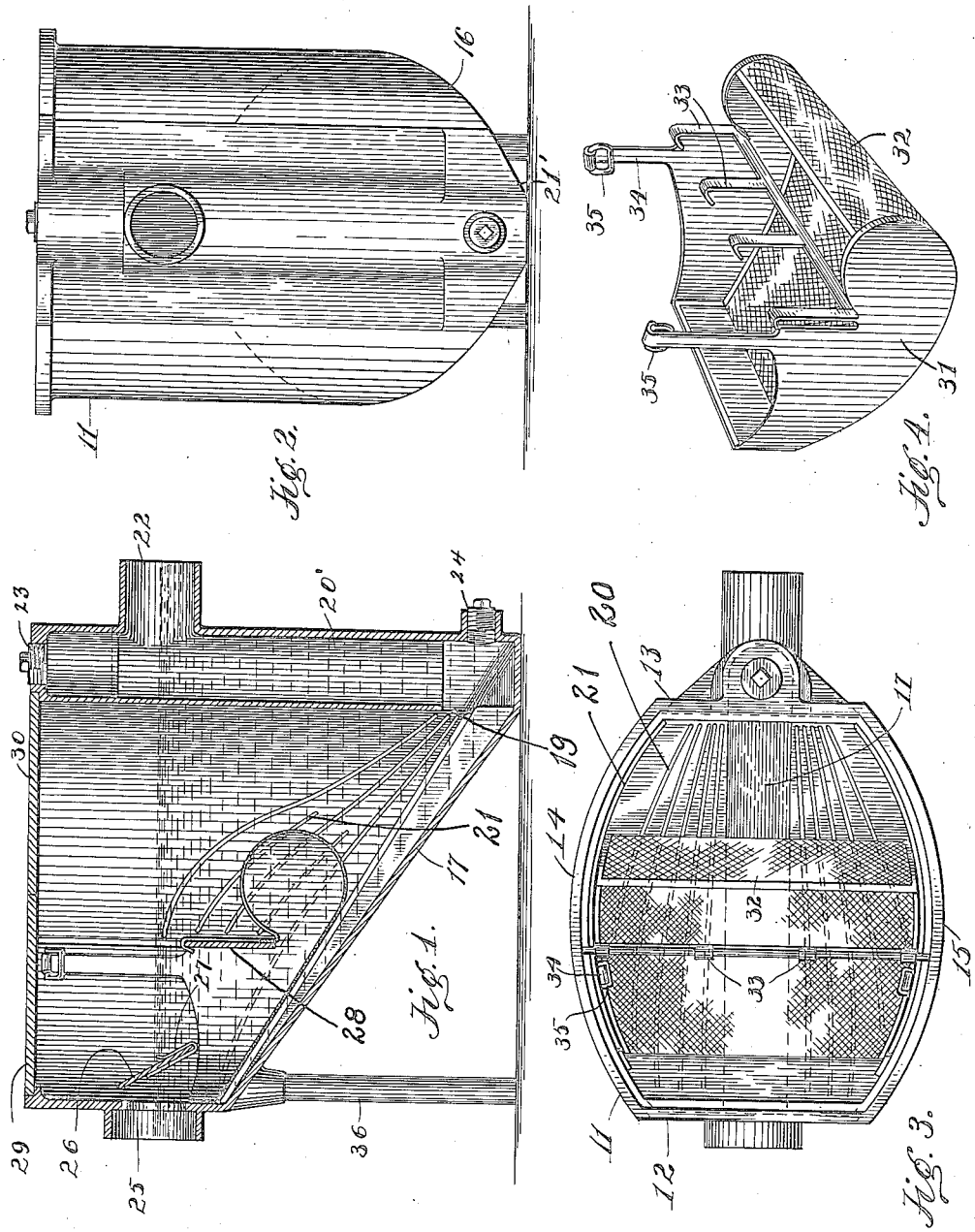
Inventor
Samuel Lewis Marsh
by Arthur Middleton,
his Attorney Nov. 20, 1923.

S. L. MARSH 1,474,938

GREASE INTERCEPTOR

Original Filed Aug. 19, 1919    2 Sheets-Sheet 2

Inventor
Samuel Lewis Marsh.
By his Attorney

Patented Nov. 20, 1923.

1,474,938

UNITED STATES PATENT OFFICE.

SAMUEL L. MARSH, OF LOS ANGELES, CALIFORNIA.

GREASE INTERCEPTOR.

Application filed August 19, 1919, Serial No. 318,516. Renewed March 2, 1922. Serial No. 540,616.

*To all whom it may concern:*

Be it known that I, SAMUEL L. MARSH, a citizen of the United States, residing at Ambassador Hotel, Los Angeles, California, have invented certain new and useful Improvements in Grease Interceptors, of which the following is a specification.

This invention relates to apparatus for treating waste waters from kitchens, slaughter houses, packing houses and the like, for the recovery of fat or the like from those waters. In the devices heretofore proposed for such use, there has been the objection that no provision has been made for the rapid conduction away from the separator, of the larger particles of refuse, such as bones, skin, etc., so that when the waste waters contain such large particles of refuse, the outlet from the separator basin is quickly stopped up and overflowing results, which is very detrimental and objectionable. Further, if there is any unusual amount of even small particles of sediment, the usual siphonic action in the overflow, is not sufficient to carry them away so that overflowing or flooding results from them. The object of the present invention is to overcome these objections.

The invention consists essentially in starting with the waste waters, disturbing the equilibrium of the mixture by causing it to obliquely change its direction of flow, whereby separation, without emulsification, of the various components of the mixture having different specific gravities is begun; passing the disturbed mixture while producing turbulence or eddies therein beneath a relatively large body of quiescent grease wherein the grease of the incoming mixture will rise into the body of the grease; facilitating said passage by having parts of the mixture accelerated in a downward direction; controlling the removal of the sediment remaining below the quiescent grease away therefrom; and removing the sediment and water from the interceptor by suction. The invention may further consist in a separating basin in which is provided a preliminary sediment collector for catching the larger particles of refuse, which collector can be readily removed from the basin and emptied.

The invention is illustrated in the accompanying drawings in which Figure 1 shows a vertical section of the basin taken through its longitudinal center line. Fig. 2 is a view of the outlet end of the basin. Fig. 3 is a plan view of the basin and Fig. 4 is a perspective view of the heavy sediment retainer or collector. Fig. 5 shows a vertical section through the center of the basin looking toward the inlet.

In the drawings, the numeral 11 indicates the basin proper, which is provided with flat ends 12 and 13 and somewhat curved sides, 14 and 15. 16 indicates the flat inclined bottom of the basin 11, which is provided with a substantially narrow, centrally depressed channel 17, tapering in depth from nothing at the top to a number of inches at the bottom. Projecting upwardly from the bottom 16, are a plurality of curved ribs 20, adapted to guide any sediment which falls on the bottom 16 into the channel 17 at its outlet 19 in the end wall 13 of the basin. 21 indicates a series of curved ribs of varying lengths, inwardly projecting from the walls 14 and 15 of the basin, for similarly guiding any particles of sediment into the channel 17 at its outlet 19. The outlet 19 opens into a siphon tube or pipe 20', provided at its bottom with a funnel-like extension 21'. 22 indicates an outlet pipe from the siphon tube 20' located close to the level of, or approximately in the same horizontal plane of the inlet 25; 23 indicates a plug for controlling the siphon action and 24 indicates a clean-out plug at the bottom of the siphon tube. By siphon tube or siphon outlet I means that the outlet 22 is connected by pipe to a sewer and as the bottom of that connecting pipe where it communicates with the sewer is always below the bottom of the separating basin, siphonic action takes place in the tube or pipe 20'. I do not mean that siphonic action is present in the separator as it is shown in the drawing but that siphonic action is present when the outlet 22 is connected with a sewer as is usual with such separators.

25 indicates the inlet of the basin 11 with an incline baffle plate 26 placed in front of the inlet for directing downwardly all solid matter in the waste water. 27 indicates a removable support for removably holding the baffle 26. 28 indicates a further removable baffle located nearer the center of the basin than the baffle 26 and located in a plane substantially below that of the baffle 26. 29 indicates a part of the top or cover of the basin 11 which may be hinged to a part 30. The top plates 29 and 30 are removable, as shown in the drawings, to permit the reclaimed grease to be intermittently removed from the basin as it slowly accumulates.

Resting upon the upper portion of the bottom of the basin is a retainer or collector of heavy or larger sediment. This collector is clearly shown in Figure 4 and is provided with solid sides 31, adapted to conform to the sides 14 and 15 of the basin. The bottom of the collector is perforated and preferably made of screen material 32 which follows the contour of the bottom of the basin for over one third of its length and then is curved upwardly as indicated in the drawing. Strap hooks, 33, are provided on the collector to engage the upper edge of the baffle 28 to assist in holding the collector in place. 34 indicates projections from the sides 31 adapted to carry at their upper ends rings or handles, 35, so that the collector may be readily removed from the basin when full of refuse. 36 indicates any suitable support for the inlet end of the basin.

While I have illustrated one preferred embodiment of my invention it is, of course to be understood that I do not intend to limit myself to the specific construction shown as many changes may be made therein without departing from the spirit of my invention.

In operation, the waste water as it comes from the kitchen, slaughter house, packing house or any other such grease or fat producing place, flows through the inlet 25 under pressure or gravity into the interceptor, whereupon it comes in contact with the baffle plate or deflector 26, which, because of its inclination obliquely to the direction of oil flow abruptly changes the direction of flow of the mixture without emulsification. This change of direction disturbs the equilibrium of the components of the mixture, whereupon the grease or fat particles force their way upwardly whereas, the water and sediment pass down the incline of the bottom of the purifier. This is duplicated but to a lesser degree by the succeeding baffle plate or deflector although the necessity for guarding against the emulsification of the grease and water is not so great in the subsequent deflector for the momentum of the grease is very much lessened by the first deflector. Emulsification has to be guarded against because if it does take place, means other than this interceptor are necessary to bring about de-emulsification.

All the larger sediment or refuse is caught by the collector which, when it becomes full, can be easily removed from the separator by lifting it therefrom by means of the handles 35 thereon. This collector renders possible the use of such a separator in slaughter houses and particularly sheep slaughter houses where at present the refuse so quickly stops up the outlet of the separators that it is impossible to use them.

In removing the collector, it is necessary to remove the two baffle plates 26 and 28, but as they are removably held in their supports, this is a simple matter.

What fine sediment escapes through the retainer, and is floated to the sides of the separator, comes in contact with the ribs 21, which may be straight, but are preferably curved, and is directed by them downwardly to the outlet 19. Similarly, what fine sediment falls to the bottom of the separator, is conducted by the curved or straight ribs 20 on the bottom to the outlet 19. By having these ribs of different lengths either on the sides or bottom or both, the sediment engaging those ribs, I find in practice to be converged to the outlet 19.

Due to the peculiar construction and inclination of the false bottom or channel 17 of increasing depth, the water of the mixture, flows downwardly at an accelerated speed so that by the time the water has passed the outlet 19 and reached the bottom of the chamber 20', it has gathered momentum enough to carry it up and out the outlet 22. Moreover, the outlet 22, being connected to a pipe leading to a sewer below the interceptor or separator, there is a certain suction or siphonic action thereby created in the chamber 20'

Therefore, the depressed channel 17 causes a flow of water to the outlet 19 which is uniformly accelerated as it descends and this acceleration of the water and what sediment or solid impurities get into the downflow of water, tend to cause the solid impurities to bounce upwardly, as it were, after passing through the outlet 19 and into the suction or siphon tube 20'. In other words, the sediment or solid impurities, after reaching the bottom of the tube 20', due to this bouncing are kept in violent agitation which permits the suction to act upon them to carry the lighter ones over the outlet pipe 22.

However, I find I must control or retard the egress of the solid impurities through the outlet 19 or else they will tend to all move at once with the resulting blocking or clogging of the outlet 19. This control of the solid impurities to retard their movement is embodied in the ribs 20 and 21 because in settling, the sediment collects between adjacent ribs whereby reservoirs are formed which hold the sediment to let it go gradually into the downflow in the channel 17 and through the outlet 19. This control and retardation of the heavy sediment is an important feature of my invention because it prevents it from passing to the outlet too rapidly which would cause clogging thereof and moreover, the ribs guide the sediment to the central channel where it is carried off due to the suction in said channel and at said outlet.

As has been explained, a quiescent body of separated grease or fat collects above the downflow of water and beneath this quiescent body, I desire to make the liquid therebelow turbulent or to produce eddies therein. The turbulence or eddies are produced by the impact of the mixture against the baffles, the curved side walls of the separator, by the ribs 20 and 21 and the drag or suction or acceleration in the channel to the outlet. The turbulence or eddies not only further facilitate the separation and flotation of the grease particles upwardly into the quiescent body but apparently cleanse the grease particles from any impurities which tend to stick thereto. It may be said that the turbulence washes the lower boundary or layer of the quiescent mass and as successive layers are being constantly added to the mass from below, the entire grease mass therein goes through this cleansing action.

It may also be pointed out that the ribs retard and guide the sediment flow on the bottom of the basin to the central channel in proportion to the rapidity of flow and suction of the water through the channel and outlet; in other words, the sediment is evacuated in ratio to the volume of water passing through the device and by that means I prevent clogging of the machine.

What I claim is:

1. A separator for grease from waste waters having a basin provided with an inlet and an outlet, the entrance end of said outlet being close to the bottom of said basin and below the discharge end of the outlet and channelled means provided on one boundary thereof for converging sediment to the outlet and controlling its passage thereto.

2. A separator for grease from waste waters having a body portion and means associated therewith for causing the separation of grease from water passing therethrough, a removable baffle plate and a refuse retainer for catching refuse in the waste waters before they are acted upon to have the grease separated therefrom, a portion of the retainer being supported from the baffle.

3. In combination in a grease separator having an inlet and outlet, a baffle provided near the inlet and inclined downwardly in the direction of current flow, and a vertical baffle located between the said inclined baffle and the outlet and substantially below the inclined baffle.

4. In a device of the character described, a basin, an inlet and an outlet therefor, the walls of said basin being convergent from the inlet to the outlet and curved to cause acceleration of the liquid flowing through the basin, and a channel in the bottom wall of the basin, said channel extending from one end of the basin to the other, the depth of the channel increasing gradually from the inlet to the outlet end.

5. In a device of the character described, a basin, an inlet and an outlet therefor, a channel in the bottom wall of the basin, said channel extending from one end of the basin to the other, the depth of the channel increasing gradually from the inlet to the outlet end, and ribs provided on the walls of said basin.

6. In a device of the character described, a basin, an inlet and outlet therefor, said basin having curved side walls converging from the said inlet to the said outlet and having a bottom wall sloping downwardly from the said inlet to the said outlet, a channel in the said bottom extending from one end of the basin to the other end, having gradually increasing depth from the inlet to the outlet end, ribs in the side and bottom walls of said basin converging toward the outlet end of said channel to guide and control the flow of sediment thereinto, and a substantially vertical channel communicating with said outlet.

7. In a device of the character described, a basin having a sloping bottom wall and curved side walls, the slope and curvature respectively of said walls being such as to increase the velocity of flow of fluid passing through said basin from one end to the other, an inlet at said one end of the basin, an outlet channel at said other end thereof, said channel having a discharge opening at approximately the same level as that of the said inlet, and having an entrance end in free communication with the lowermost portion of said basin, and guide members in the walls of said basin for guiding sediment to the entrance end of said channel.

8. In a device of the character described, a basin, an inlet and outlet therefor, the walls of said basin being convergent to the outlet and curved whereby turbulence is caused in liquid flowing through the basin, and a channel in the bottom of the basin extending from one end of the basin to the other, the depth of the channel increasing gradually from the inlet to the outlet.

In testimony whereof I have affixed my signature to this specification.

SAMUEL L. MARSH.